United States Patent
Tarao

(10) Patent No.: US 9,161,192 B2
(45) Date of Patent: Oct. 13, 2015

(54) STORAGE MEDIUM STORING ADDRESS-INFORMATION DISPLAY PROGRAM AND COMMUNICATION CONTROLLING DEVICE

(71) Applicant: BROTHER KOGYO KABUSHIKI KAISHA, Nagoya-shi, Aichi-ken (JP)

(72) Inventor: Ryoko Tarao, Toyoake (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 39 days.

(21) Appl. No.: 14/035,881

(22) Filed: Sep. 24, 2013

(65) Prior Publication Data
US 2014/0087701 A1 Mar. 27, 2014

(30) Foreign Application Priority Data

Sep. 26, 2012 (JP) .................................. 2012-213079

(51) Int. Cl.
*H04M 3/42* (2006.01)
*H04W 4/16* (2009.01)
*H04W 4/18* (2009.01)
*H04W 4/00* (2009.01)
*H04W 4/20* (2009.01)

(52) U.S. Cl.
CPC *H04W 4/16* (2013.01); *H04W 4/18* (2013.01); *H04W 4/005* (2013.01); *H04W 4/20* (2013.01)

(58) Field of Classification Search
CPC ....... H04W 4/003; H04W 4/005; H04W 4/16; H04W 4/20; H04W 4/24; H04W 4/025; H04W 76/00; H04W 4/14; H04W 4/18; H04W 4/26; H04W 76/02

USPC .............. 455/414.1, 415, 416, 417, 418, 419, 455/420, 432.3, 405, 406, 411, 455
See application file for complete search history.

(56) References Cited

U.S. PATENT DOCUMENTS

| | | | |
|---|---|---|---|
| 5,887,136 A * | 3/1999 | Yasuda et al. | 709/204 |
| 2006/0089125 A1* | 4/2006 | Frank | 455/411 |
| 2006/0105745 A1* | 5/2006 | Frank | 455/411 |
| 2007/0123310 A1* | 5/2007 | Natsuno et al. | 455/566 |
| 2008/0250494 A1 | 10/2008 | Nagata | |

(Continued)

FOREIGN PATENT DOCUMENTS

| | | |
|---|---|---|
| JP | 7-015541 A | 1/1995 |
| JP | H11-331411 A | 11/1999 |

(Continued)

OTHER PUBLICATIONS

Office Action (Notice of Allowance) issued in related U.S. Appl. No. 14/034,517, mailed Oct. 24, 2014 (10 pages).

*Primary Examiner* — Jean Gelin
(74) *Attorney, Agent, or Firm* — Merchant & Gould PC

(57) ABSTRACT

A storage medium stores an address-information display program including a set of program instructions executable on an information processing device configured to communicate with a communication counterpart through a communication device having at least one communication function. The information processing device stores address information of the communication counterpart. The set of program instructions includes: an address-information determining process of determining, out of the address information, usable address information that is usable with the at least one communication function of the communication device; and a displaying process of displaying the usable address information on a display of the information processing device in a distinguishable manner.

20 Claims, 13 Drawing Sheets

(56) References Cited

U.S. PATENT DOCUMENTS

| | | |
|---|---|---|
| 2009/0066998 A1 | 3/2009 | Kato |
| 2010/0214604 A1 | 8/2010 | Hosono et al. |
| 2011/0197163 A1* | 8/2011 | Jegal et al. .................... 715/811 |
| 2011/0256907 A1* | 10/2011 | Lee et al. ....................... 455/566 |
| 2011/0292445 A1 | 12/2011 | Kato |
| 2011/0300883 A1* | 12/2011 | Kwon ............................ 455/457 |
| 2014/0086398 A1 | 3/2014 | Tabushi |

FOREIGN PATENT DOCUMENTS

| | | |
|---|---|---|
| JP | 2006-163791 A | 6/2006 |
| JP | 2007-312142 A | 11/2007 |
| JP | 2008-092077 A | 4/2008 |
| JP | 2008-258893 A | 10/2008 |
| JP | 2009-147896 A | 7/2009 |
| JP | 2010-199642 A | 9/2010 |
| JP | 2011-101125 A | 5/2011 |

* cited by examiner

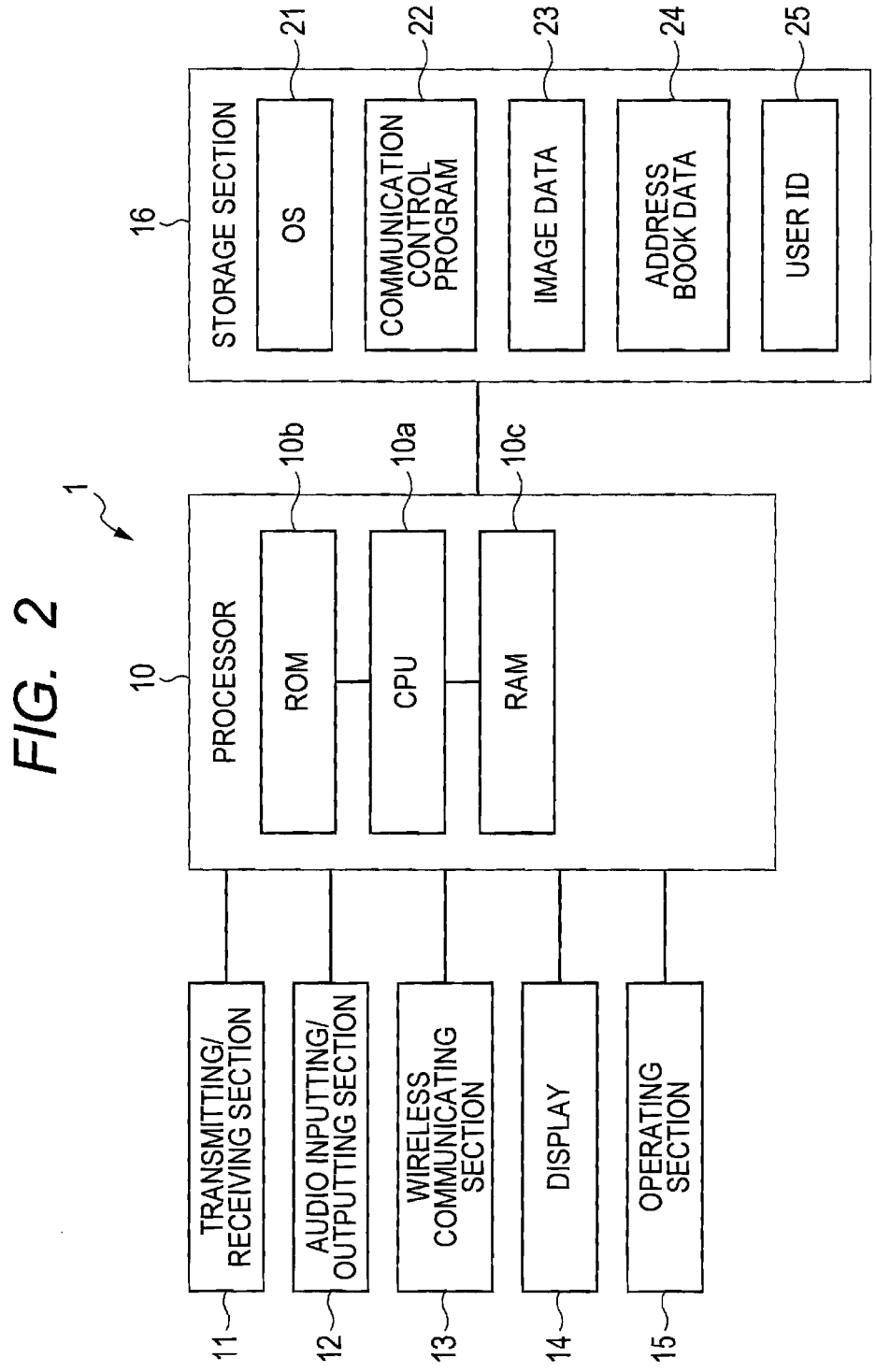

| ADDRESS BOOK DATA | | |
|---|---|---|
| COMMUNICATION COUNTERPART | COMMUNICATION MODE | ADDRESS INFORMATION |
| AAAAA | TELEPHONE | 111-1111-1111 |
| | FAX | 111-1111-1112 |
| | Scan to E-mail | aaa@xxx.com |
| | Scan to URL | http://www.xxx.com/aaa |
| BBBBB | TELEPHONE | 222-2222-2221 |
| | FAX | 222-2222-2222 |
| | Scan to E-mail | bbb@xxx.com |
| | Scan to URL | http://www.xxx.com/bbb |
| CCCCC | TELEPHONE | 333-3333-3331 |
| | FAX | 333-3333-3332 |
| | Scan to E-mail | ccc@yyy.com |
| | Scan to URL | http://www.yyy.com/ccc |
| DDDDD | TELEPHONE | 444-4444-4441 |
| | FAX | 444-4444-4442 |
| | Scan to E-mail | ddd@zzz.com |
| | Scan to URL | http://www.zzz.com/ddd |

FIG. 4

USABLE-FUNCTION-FOR-EACH-USER TABLE (26)

| USER ID | USABLE-FUNCTION-FOR-EACH-USER INFORMATION | | |
|---|---|---|---|
| | TELEPHONE | FAX | SCANNER |
| User1 | ○ | | ○ |
| User2 | | ○ | ○ |
| User3 | ○ | ○ | |
| User4 | ○ | | |
| User5 | ○ | ○ | ○ |
| User6 | | | ○ |
| User7 | | ○ | |
| User8 | | | |
| User9 | ○ | | ○ |
| User10 | | ○ | |

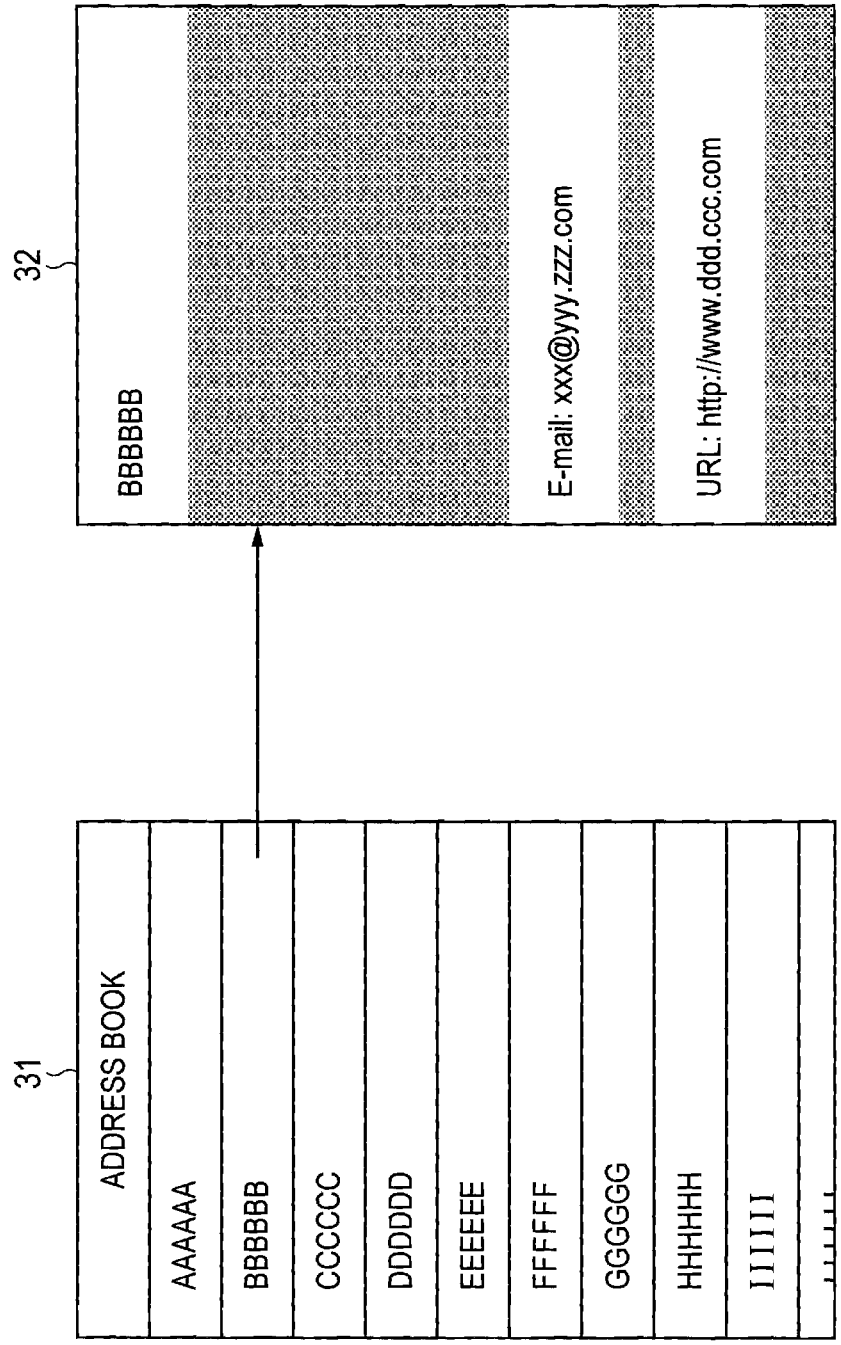

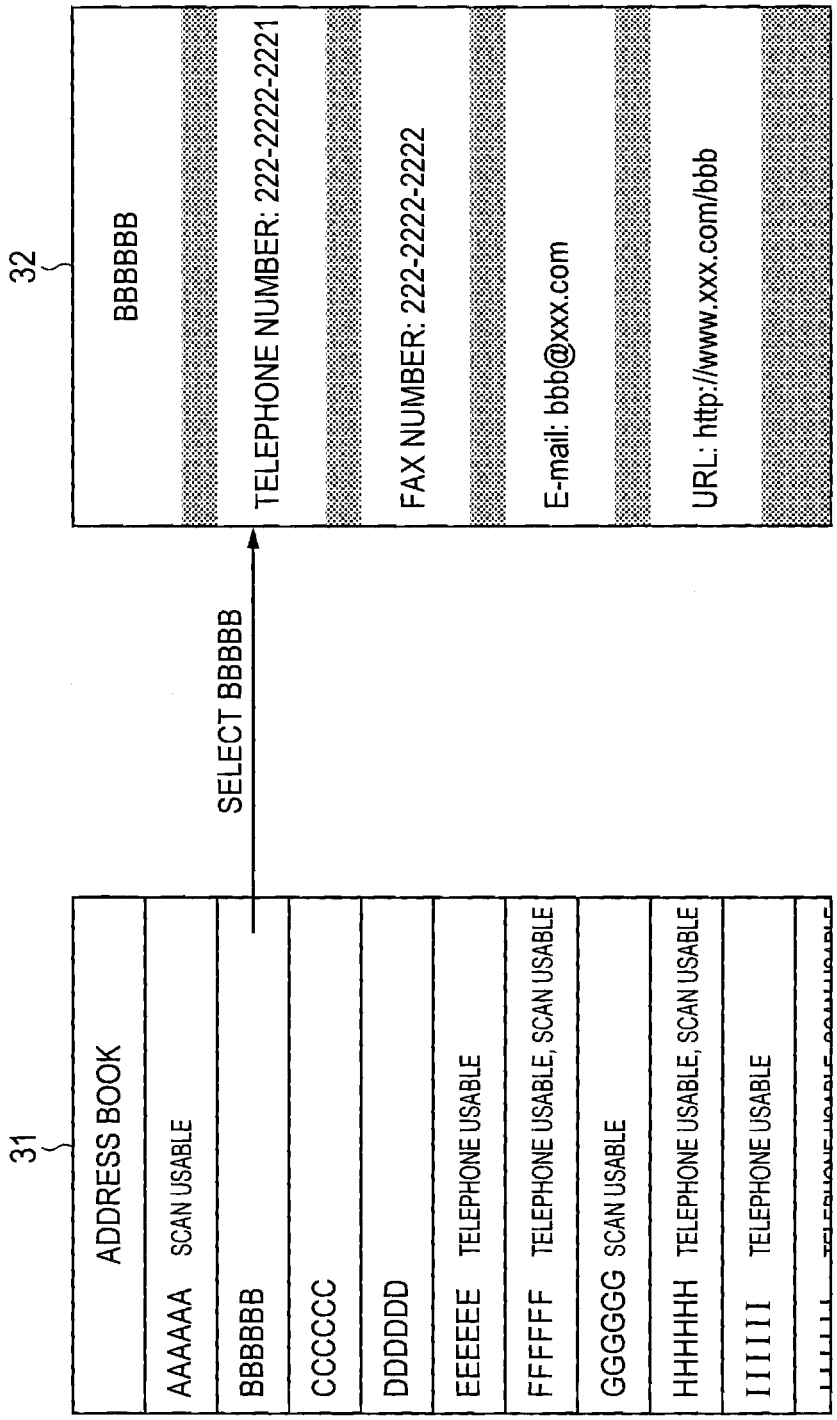

STORAGE MEDIUM STORING ADDRESS-INFORMATION DISPLAY PROGRAM AND COMMUNICATION CONTROLLING DEVICE

CROSS REFERENCE TO RELATED APPLICATIONS

This application claims priority from Japanese Patent Application No. 2012-213079 filed Sep. 26, 2012. The entire content of the priority application is incorporated herein by reference.

TECHNICAL FIELD

The invention relates to technology for displaying address information.

BACKGROUND

Technology for transmitting data to communication devices by using telephone directory data stored in terminal devices has been conventionally known. For example, a communication device is known that determines the type of data received from a terminal device, and, when the received data includes both telephone directory data and data other than the telephone directory data, transmits the data other than the telephone directory data, out of the received data, to a destination of the telephone directory data.

SUMMARY

Incidentally, there are some cases where address information cannot be used even though the address information such as the telephone directory data is selected, because users that can use the communication device are limited, errors are caused in the communication device, and the like. In this case, the selection of the address information by the user with the terminal device ends up in vain.

This specification discloses technology of reducing the possibility of vainly selecting the address information that cannot be used in the communication device, when performing communication via the communication device.

The invention provides a storage medium storing an address-information display program including a set of program instructions executable on an information processing device configured to communicate with a communication counterpart through a communication device having at least one communication function. The information processing device stores address information of the communication counterpart. The set of program instructions includes: an address-information determining process of determining, out of the address information, usable address information that is usable with the at least one communication function of the communication device; and a displaying process of displaying the usable address information on a display of the information processing device in a distinguishable manner.

According to another aspect, the invention provides a communication controlling device configured to communicate with a communication counterpart through a communication device having at least one communication function. The communication controlling device includes a processor, a display, and a storage device storing address information of the communication counterpart. The processor is configured to: determine, out of the address information, usable address information that is usable with the at least one communication function of the communication device; and display the usable address information on the display in a distinguishable manner.

Note that the technology disclosed herein can be realized in various aspects such as a communication controlling device, an address-information display method, a storage medium storing an address-information display program, and the like.

BRIEF DESCRIPTION OF THE DRAWINGS

Embodiments in accordance with the invention will be described in detail with reference to the following figures wherein:

FIG. 2 is a block diagram showing an electrical configuration of the mobile phone in a simplified manner;
FIG. 3 is a schematic view showing address book data;
FIG. 4 is a schematic view showing a usable-function-for-each-user table;
FIG. 11 is a schematic view showing user interfaces of a communication control program according to a third embodiment;
and
FIG. 12 is a schematic view showing a communication-counterpart selecting screen according to a fourth embodiment.

DETAILED DESCRIPTION

<First Embodiment>

Figure 1:
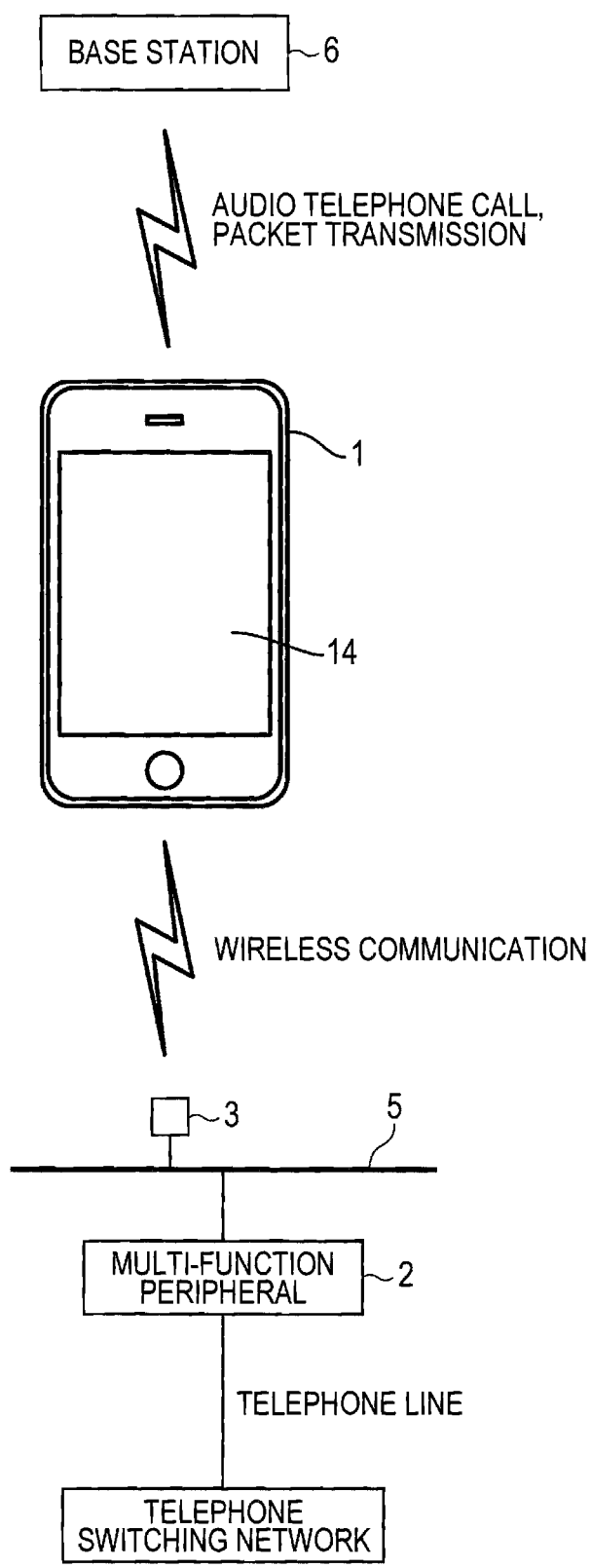
FIG. 1 is a schematic view showing a mobile phone.

A first embodiment will be described with reference to FIGS. 1 to 7.

(1) Mobile Phone

First, a mobile phone 1 as an information processing device and a communication controlling device according to the first embodiment will be described with reference to FIG. 1. The mobile phone 1 is a so-called smart phone. The mobile phone 1 has not only a telephone function but also a wireless communication function, and is connected wirelessly to a communication network 5 such as a LAN (Local Area Network) or the Internet via a wireless LAN access point 3 and the like.

As will be described later in detail, the mobile phone 1 can communicate with a communication counterpart by a communication function of a multi-function peripheral (MFP) 2 that is connected to the communication network 5, by executing a later-described communication control program 22 (refer to FIG. 2). The multi-function peripheral 2 is an example of a communication device.

(2) Electrical Configuration of Information Processing Device

An electrical configuration of the mobile phone 1 will be described with reference to FIG. 2. The mobile phone 1 includes a processor 10, a transmitting/receiving section 11, an audio inputting/outputting section 12, a wireless communicating section 13, a display 14, an operating section 15, and a storage section 16.

The processor 10 includes a CPU 10a, ROM 10b, RAM 10c, and the like. The CPU 10a controls the respective units of the mobile phone 1 by executing programs stored in the ROM 10b and in the storage section 16. The ROM 10b stores the programs to be executed by the CPU 10a, data, and the like. The RAM 10c is used as main memory for the CPU 10a to execute various processes.

The transmitting/receiving section 11 includes an antenna, an RF (Radio Frequency) circuit, a baseband processor, and the like, and transmits/receives an audio signal to/from a base station 6 via the antenna. The transmitting/receiving section 11 is also able to perform packet transmission between itself and the base station 6.

The audio inputting/outputting section 12 includes a microphone, a speaker, a voice processing circuit, and the like. The audio signal that is inputted by the microphone is transmitted to the base station 6 by the transmitting/receiving section 11. Sound of the audio signal that is received by the transmitting/receiving section 11 from the base station 6 is produced by the speaker.

The wireless communicating section 13 is configured in conformity with Wi-Fi (registered trademark), and is wirelessly connected to the communication network 5 via the wireless LAN access point 3. Incidentally, the wireless communicating section 13 may perform the wireless communication according to a wireless communication standard other than Wi-Fi.

The display 14 includes a display device such as a liquid crystal display, a display driving circuit that drives the display device, and the like.

The operating section 15 includes a nearly transparent touch panel that covers a display screen of the display device provided in the display 14, a control circuit that controls the touch panel, various operating buttons, and the like. By operating the operating section 15, a user can input telephone numbers, operate application programs, and the like.

The storage section 16 is a device to store various programs and data using nonvolatile memory such as flash memory. The storage section 16 stores an operating system (referred to as an OS) 21, a communication control program 22, image data 23, address book data 24, user IDs 25, and the like. The communication control program 22 is an example of an address-information display program. Further, the user IDs 25 are an example of user identification information.

(3) Multi-Function Peripheral

The multi-function peripheral 2 shown in FIG. 1 has a printer function, a scanner function, a copy function, a telephone function, a facsimile (referred to as a FAX) function, a scan-to-Email function, and a scan-to-URL function.

Among the above-described functions, the telephone function, the FAX function, the scan-to-Email function, and the scan-to-URL function are examples of the communication functions. As described above, the mobile phone 1 can communicate with the communication counterpart by these communication functions. The communication functions are functions for performing communications in communication modes such as telephone, FAX, scan-to-Email, and scan-to-URL. This will be described in detail as follows.

(3-1) Telephone Function

The telephone function is a function of making a telephone call from the mobile phone 1 to the communication counterpart via the multi-function peripheral 2. When using the telephone function, the user transmits a telephone number of the communication counterpart from the mobile phone 1 via the communication network 5 to the multi-function peripheral 2. The telephone number is an example of the address information.

Upon receiving the telephone number, the multi-function peripheral 2 originates a telephone call to the telephone number. Once a telephone line is connected, the multi-function peripheral 2 transmits the audio signal that is received from the communication counterpart via the telephone line to the mobile phone 1 via the communication network 5. In addition, the multi-function peripheral 2 transmits the audio signal that is received from the mobile phone 1 via the communication network 5 to the communication counterpart via the telephone line.

(3-2) FAX Function

The FAX function is a function of performing FAX transmission of the image data 23 that is stored in the storage section 16 to an external FAX device via the multi-function peripheral 2.

When using the FAX function, the user transmits a FAX number of the communication counterpart and the image data 23 to be transmitted, from the mobile phone 1 via the communication network 5 to the multi-function peripheral 2. The FAX number is an example of the address information.

Upon receiving the FAX number and the image data 23, the multi-function peripheral 2 performs the FAX transmission of the image data 23 to the communication counterpart who is identified by the received FAX number. Note that such a configuration may be employed that the multi-function peripheral 2 generates image data by scanning an original document, and performs the FAX transmission of the generated image data.

(3-3) Scan-to-Email function

The scan-to-Email function is a function that the multi-function peripheral 2 generates image data by scanning an original document, and transmits the generated image data by attaching the image data to an email.

When using the scan-to-Email function, the user first sets the original document to be transmitted to the multi-function peripheral 2. Then, the user transmits an email address of the communication counterpart from the mobile phone 1 via the communication network 5 to the multi-function peripheral 2. The email address is an example of the address information.

Upon receiving the email address, the multi-function peripheral 2 scans the set original document and generates the image data. Next, the multi-function peripheral 2 sets the email address that is received from the mobile phone 1 as a destination of the email, and transmits the email with the generated image data attached thereto.

(3-4) Scan-to-URL function

The scan-to-URL function is a function that the multi-function peripheral 2 generates the image data by scanning the original document, and transmits the generated image data to an external server that is identified by a URL (Uniform Resource Locator).

When using the scan-to-URL function, the user first sets the original document to be transmitted to the multi-function peripheral 2. Then, the user transmits the URL of the communication counterpart from the mobile phone 1 via the communication network 5 to the multi-function peripheral 2. The URL is an example of the address information.

Upon receiving the URL, the multi-function peripheral 2 scans the set original document and generates the image data. Then, the multi-function peripheral 2 transmits the generated image data to the external server identified by the URL that is received from the mobile phone 1. The transmission is performed using HTTP (HyperText Transfer Protocol). The transmission may also be performed using FTP (File Transfer Protocol).

(4) Address Book Data

Next, the address book data 24 stored in the storage section 16 will be described with reference to FIG. 3. In the address book data 24, as shown in FIG. 3, the address information for each communication mode is registered for each communication counterpart.

In FIG. 3, character strings such as "AAAAA" and "BBBBB" show names of the communication counterparts. FIG. 3 also shows the telephone, the FAX, the scan to Email, and the scan to URL as the communication modes. The address information for each communication mode is used as the address information when communication is performed by the communication functions of the multi-function peripheral 2. Note that the address information is not only for communication by the communication functions of the multi-function peripheral 2. For example, the telephone number is used when making a telephone call from the mobile phone 1.

(5) Usable Address Information

When performing communication by using the communication functions of the multi-function peripheral 2, the user of the mobile phone 1 cannot always use the address information registered in the address book data 24 at all times. The address information cannot be used due to various reasons, which will be described specifically as follows.

(5-1) Restriction of Use of Address Information Based on Use Restriction of Function The multi-function peripheral 2 restricts the usable functions for each user. This control is performed by using a usable-function-for-each-user table 26 shown in FIG. 4. The usable-function-for-each-user table 26 is stored within the multi-function peripheral 2. The usable-function-for-each-user table 26 stores user IDs of the users who use the communication functions of the multi-function peripheral 2. Availability of the respective functions is stored for each user ID. In FIG. 4, the function with a circle means that the function is usable, and the function without a circle means that the function is unusable. In the following description, information other than the user IDs in the usable-function-for-each-user table 26 is referred to as usable-function-for-each-user information.

Assuming that the user ID of the user of the mobile phone 1 is User1, for example, it is possible for the User1 to use the telephone function, as shown in FIG. 4. In this case, the multi-function peripheral 2 permits the user of the mobile phone 1 (specifically, the User1) to use the telephone function. Meanwhile, assuming that the user ID of the user of the mobile phone 1 is User2, for example, it is not possible for the User2 to use the telephone function, as shown in FIG. 4. In this case, the multi-function peripheral 2 rejects the use of the telephone function by the user of the mobile phone 1 (specifically, the User2).

When the scanner function is usable by the user of the mobile phone 1, the multi-function peripheral 2 permits the user to use both of the scan-to-Email function and the scan-to-URL function. Meanwhile, when the scanner function is unusable, the multi-function peripheral 2 rejects the use of both of the scan-to-Email function and the scan-to-URL function.

When the user transmits to the multi-function peripheral 2 the address information corresponding to the unusable function, the use of the communication function is rejected by the multi-function peripheral 2 and, as a result of that, the user cannot use the address information corresponding to the unusable function.

(5-2) Restriction of Use of Address Information Based on Address Usability Information The multi-function peripheral 2 stores address usability information in order to identify usable address information. Upon receiving the address information from the mobile phone 1, the multi-function peripheral 2 determines whether to permit the use of the address information based on the address usability information.

For the telephone function, for example, an area code, a country code, a specific telephone number, and the like, to which a telephone call is permitted, are registered in the address usability information. When permitting a telephone call only to a specific country, for example, an administrator of the multi-function peripheral 2 registers the country code, to which a telephone call is permitted, in the address usability information. Upon receiving from the mobile phone 1a telephone number that includes a country code other than the specific country code, the multi-function peripheral 2 rejects the use of the telephone number because a telephone call to the country is not permitted. This also applies to the FAX number.

Note that the area code, the country code, the specific telephone number, and the like, to which a telephone call is not permitted, may be registered in the address usability information.

For the scan-to-Email function and the scan-to-URL function, a domain name of a domain, to which the communication is permitted, is registered in the address usability information. When permitting the transmission of the image data only to a specific domain, for example, the administrator of the multi-function peripheral 2 registers the domain name in the address usability information. Upon receiving from the mobile phone 1 an email address or a URL in which the domain name is not included, the multi-function peripheral 2 rejects the use of the email address and the URL because transmission to the domain is not permitted.

Note that the domain, to which the transmission is not permitted, may be registered in the address usability information.

When the user transmits to the multi-function peripheral 2 the address information the use of which is not permitted, the use of the address information is rejected by the multi-function peripheral 2. Consequently, the user cannot use the address information the use of which is not permitted.

(5-3) Restriction of Use of Address Information for User in Unchargeable State

The multi-function peripheral 2 charges the user for the use of the communication functions. Specifically, the user ID of the user to be charged and information for charging the user are associated with each other and stored in the multi-function peripheral 2. The information for charging includes a credit card number and the like.

Upon receiving the address information from the mobile phone 1, the multi-function peripheral 2 determines whether the user ID of the user of the mobile phone 1 is registered in the multi-function peripheral 2 as the user ID to be charged. When the user ID is registered, the multi-function peripheral 2 determines whether the user is in a chargeable state. The chargeable state means the state in which the user ID of the user is associated with the above-described information for charging.

When the user is in the chargeable state, the multi-function peripheral 2 gives permission to the use of the communication functions and charges the user for the communication. Meanwhile, when the user is in an unchargeable state, the multi-function peripheral 2 rejects the use of all the communication functions.

When the user is in the unchargeable state, the use of all the communication functions is rejected. Consequently, the user cannot use the entire pieces of the address information.

(5-4) Restriction of Use of Address Information Based on State of Multi-Function Peripheral The multi-function peripheral 2 may be turned off, or may have a failure in the communication functions. When the multi-function peripheral 2 is turned off, the user cannot use the entire pieces of the address information. Further, when a failure occurs only in the specific communication function, the user cannot use the address information corresponding to the communication function.

(6) Communication Control Program

Next, the communication control program 22 that is executed in the mobile phone 1 will be described. The communication control program 22 has a function of displaying the address information registered in the address book data 24 on the display 14, a function of receiving selection of the displayed address information, a function of instructing the multi-function peripheral 2 to communicate with the communication counterpart who is identified by the address information by using the communication function corresponding to the selected address information, and the like.

(6-1) User Interface of Communication Control Program

Figure 5:
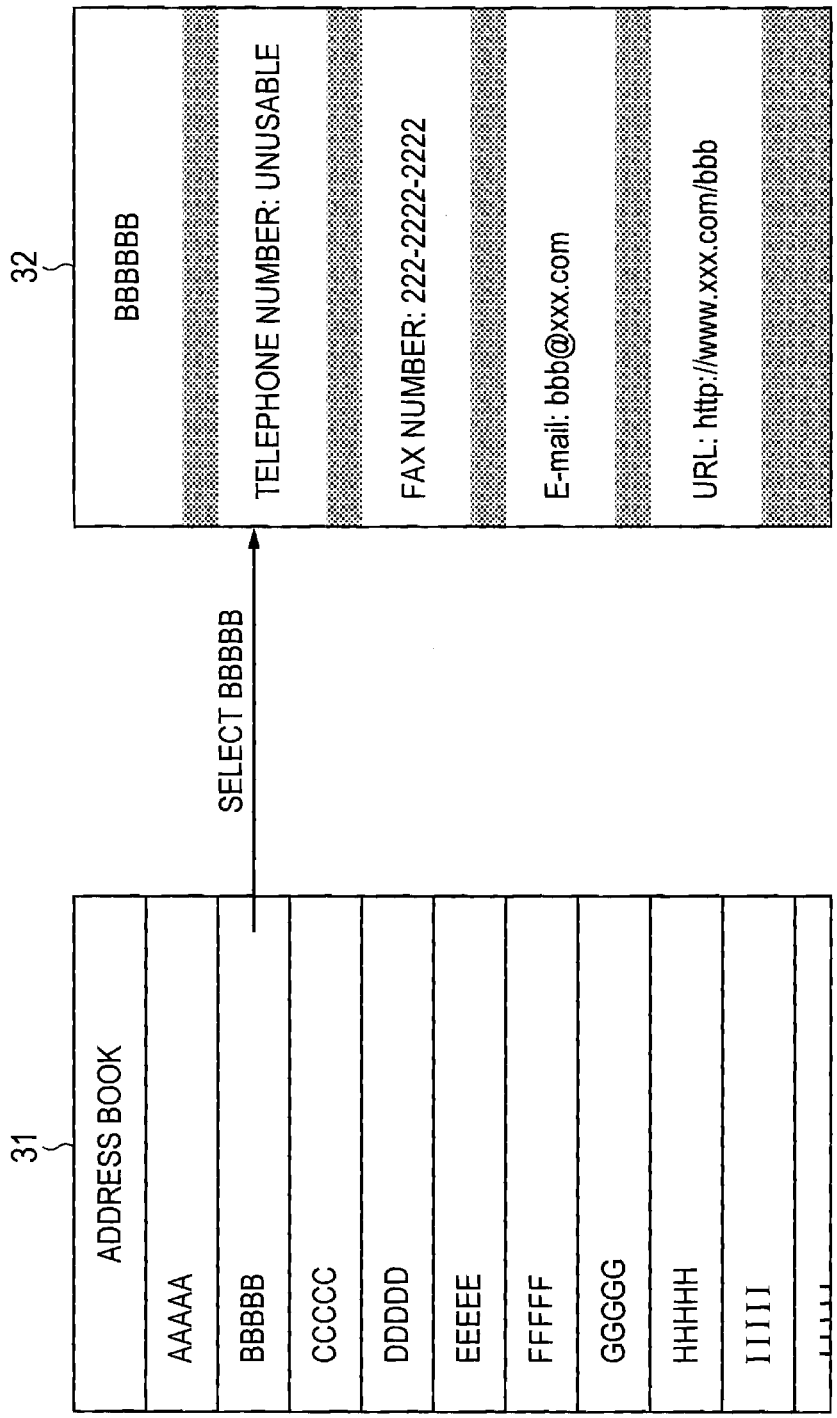
FIG. 5 is a schematic view showing user interfaces of a communication control program.

A user interface and a flow of the communication control program 22 (communication control process) will be described with reference to FIGS. 5 and 6. Note that FIG. 5 shows only the user interface at the time of receiving the selection of the address information, out of the user interfaces of the communication control program 22.

In accordance with the communication control program 22, the CPU 10*a* controls the display 14 to display a communication-counterpart selecting screen 31 and an address-information selecting screen 32.

The communication-counterpart selecting screen 31 is the screen that displays a list of the names of the communication counterparts who are registered in the address book data 24, and receives the selection of the communication counterpart from the user. When the user selects the communication counterpart on the communication-counterpart selecting screen 31, the CPU 10*a* controls the display 14 to display the address-information selecting screen 32 in accordance with the communication control program 22.

Figure 6:
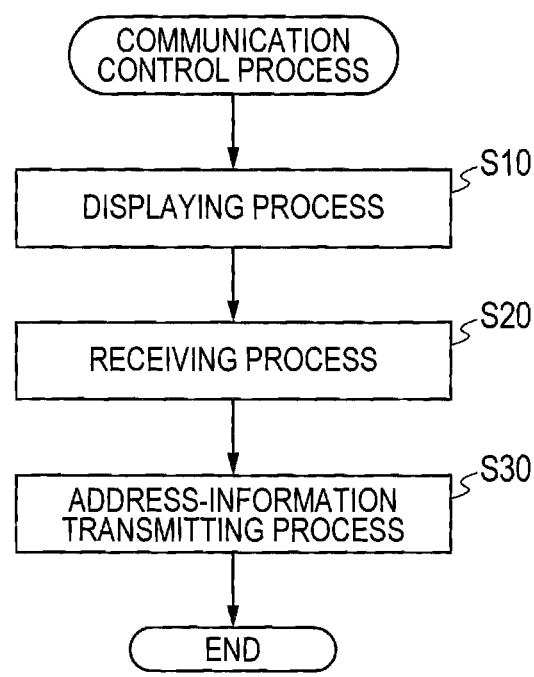
FIG. 6 is a flowchart showing the flow of a communication control process.

The address-information selecting screen 32 is the screen that displays the address information for each communication mode of the communication counterpart who is selected on the communication-counterpart selecting screen 31 (S10 in FIG. 6), and receives the selection of the address information from the user (S20 in FIG. 6).

The processes of displaying the communication-counterpart selecting screen 31 and the address-information selecting screen 32 are examples of a displaying process. Further, the process of receiving the selection of the address information on the address-information selecting screen 32 is an example of a receiving process.

Incidentally, when communicating with the communication counterpart via the multi-function peripheral 2, it is not necessarily possible for the user of the mobile phone 1 to use the address information registered in the address book data 24 at all times, as described above. In the case where the address information cannot be used, the multi-function peripheral 2 rejects the communication when the user of the mobile phone 1 selects the unusable address information on the address-information selecting screen 32, as a result of which the selection of the address information ends up in vain.

For this reason, the communication control program 22 causes the address-information selecting screen 32 to display the address information in such a manner that the address information usable by the user of the mobile phone 1 can be distinguished. Specifically, the communication control program 22 according to the first embodiment causes the address-information selecting screen 32 to display only the usable address information.

When the user of the mobile phone 1 cannot use the telephone function, for example, the communication control program 22 causes a message of "unable to use" to be displayed as shown in the address-information selecting screen 32, without causing the telephone number to be displayed. This allows the user to recognize that the selection of the telephone number is not possible.

(6-2) Displaying Process

Figure 7:
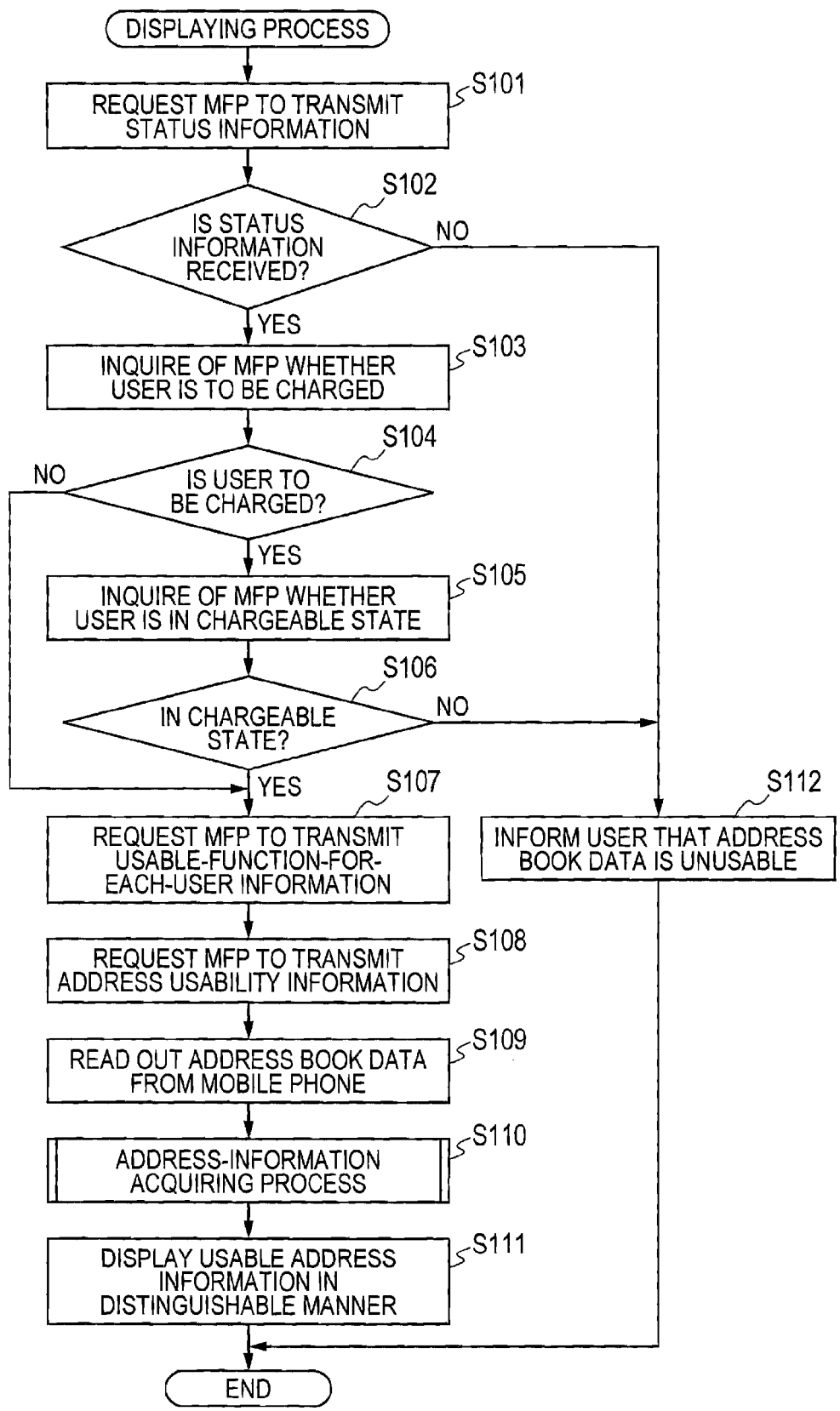
FIG. 7 is a flowchart showing the flow of a displaying process.

The displaying process of displaying the above-described address-information selecting screen 32 will be described with reference to FIG. 7. This process is started when the communication counterpart is selected on the communication-counterpart selecting screen 31.

In S101, the CPU 10*a* that executes the communication control program 22 (hereinafter referred to as the communication control program 22) requests the multi-function peripheral 2 to transmit status information showing operability of the respective functions.

Upon receiving the request to transmit the status information from the mobile phone 1, the multi-function peripheral 2 determines the operability of the respective functions, and transmits the status information showing the operability of the respective functions to the mobile phone 1.

For the telephone function, for example, the multi-function peripheral 2 determines whether it is impossible to make a telephone call, including the case where the telephone line is not connected. When a telephone call cannot be made, it is determined as an inoperable state, otherwise it is determined as an operable state. This also applies to the FAX function.

For the scanner function, the multi-function peripheral 2 determines whether it is impossible to scan the original document, including the case where jamming of the original document is caused. When the scanning is impossible, it is determined as the inoperable state, otherwise it is determined as the operable state.

For the printer function, the multi-function peripheral 2 determines whether it is impossible to perform the printing, including the cases where jamming of recording paper is caused, shortage of remaining quantity of consumables such as ink is caused, and the like. When the printing is impossible, it is determined as the inoperable state, otherwise it is determined as the operable state.

Note that the mobile phone 1 and the multi-function peripheral 2 cannot communicate with each other in some cases, such as when the multi-function peripheral 2 is turned off, when a failure occurs in the communication network 5 that connects the mobile phone 1 and the multi-function peripheral 2, and the like. In this case, the mobile phone 1 does not receive the status information after an elapse of a certain period of time after sending the request to transmit the status information to the multi-function peripheral 2.

In S102, the communication control program 22 determines whether the status information is received from the multi-function peripheral 2 within the above-described certain period of time, and causes the process to move to S103 when the status information is received, and to S112 when the status information is not received.

In S103, the communication control program 22 inquires of the multi-function peripheral 2 whether the user of the mobile phone 1 is the user to be charged. At this time, the communication control program 22 transmits the user ID 25 of the user of the mobile phone 1 to the multi-function peripheral 2.

Upon receiving the inquiry from the mobile phone 1 whether the user is the user to be charged, the multi-function peripheral 2 determines whether the received user ID 25 is registered as the user ID to be charged. When the received user ID 25 is registered, the multi-function peripheral 2 transmits to the mobile phone 1 charge information showing that the user is the user to be charged. When the received user ID 25 is not registered, on the other hand, the multi-function peripheral 2 transmits to the mobile phone 1 the charge information showing that the user is not the user to be charged.

In S104, the communication control program 22 determines whether the user of the mobile phone 1 is the user to be charged based on the charge information received from the multi-function peripheral 2, and causes the process to move to S105 when the user is the user to be charged, and to S107 when the user is not the user to be charged. S104 is an example of a user determining process.

In S105, the communication control program 22 inquires of the multi-function peripheral 2 whether the user is in the chargeable state. At this time, the communication control program 22 transmits the user ID 25 of the user of the mobile phone 1 to the multi-function peripheral 2.

The multi-function peripheral 2 determines whether the received user ID 25 is associated with, for example, a valid credit card number, and determines that the user is in the chargeable state when it is in association. When the user is in the chargeable state, the multi-function peripheral 2 transmits to the mobile phone 1 response information showing that the user is in the chargeable state. When the user is in the unchargeable state, on the other hand, the multi-function peripheral 2 transmits to the mobile phone 1 the response information showing that the user is in the unchargeable state.

In S106, the communication control program 22 determines whether the user of the mobile phone 1 is in the chargeable state, based on the response information received from the multi-function peripheral 2, and causes the process to move to S107 when the user is in the chargeable state, and to S112 when the user is in the unchargeable state. S106 is an example of a chargeability determining process.

In S107, the communication control program 22 requests the multi-function peripheral 2 to transmit the usable-function-for-each-user information showing the functions usable by the user of the mobile phone 1. At this time, the communication control program 22 transmits the user ID 25 of the user of the mobile phone 1 to the multi-function peripheral 2.

Upon receiving the request to transmit the usable-function-for-each-user information from the mobile phone 1, the multi-function peripheral 2 refers to the usable-function-for-each-user table 26 and transmits to the mobile phone 1 the usable-function-for-each-user information corresponding to the user ID 25 received from the mobile phone 1.

Note that the multi-function peripheral 2 may transmit the usable-function-for-each-user information showing the unusable functions to the mobile phone 1. Then, the mobile phone 1 may determine the functions other than the unusable functions as the usable functions.

In S108, the communication control program 22 requests the multi-function peripheral 2 to transmit the address usability information.

Upon receiving the request to transmit the address usability information from the mobile phone 1, the multi-function peripheral 2 transmits the address usability information to the mobile phone 1.

In S109, the communication control program 22 reads out from the address book data 24 the address information for each communication mode of the communication counterpart who is selected on the communication-counterpart selecting screen 31.

In S110, the communication control program 22 executes an address-information acquiring process. The address-information acquiring process is the process to acquire a piece of the address information that is usable by the user of the mobile phone 1, out of pieces of the address information read out in S109. In the address-information acquiring process, as will be described later in detail, only the usable piece of address information is acquired, and the unusable piece of address information is not acquired.

In S111, the communication control program 22 causes the display 14 to display the address-information selecting screen 32. With regard to the communication mode of which address information can be acquired in S110, the communication control program 22 causes the address-information selecting screen 32 to display the acquired address information. With regard to the communication mode of which address information cannot be acquired in S110, the communication control program 22 causes the address-information selecting screen 32 to display a message of "unusable" in a space where the address information of the communication mode is displayed. Thus, the address information that is determined to be unusable can be distinguished on the display.

In S112, the communication control program 22 causes the display 14 to display a message to the effect that the address book data 24 is unusable, and informs the user that the address book data 24 is unusable. Note that this information may be given with sound.

(6-3) Address-Information Acquiring Process

Figure 8A:
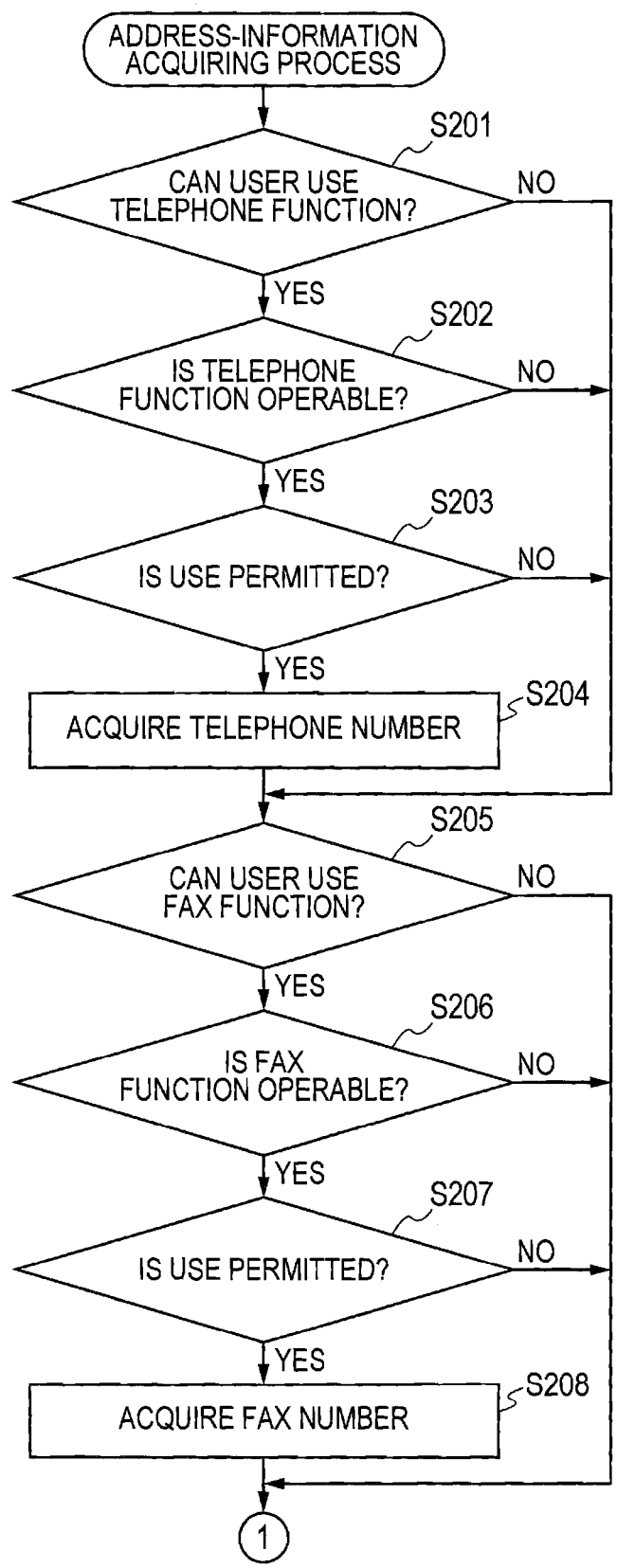
FIG. 8A is a flowchart showing the flow of an address-information acquiring process (the first half)
Figure 8B:
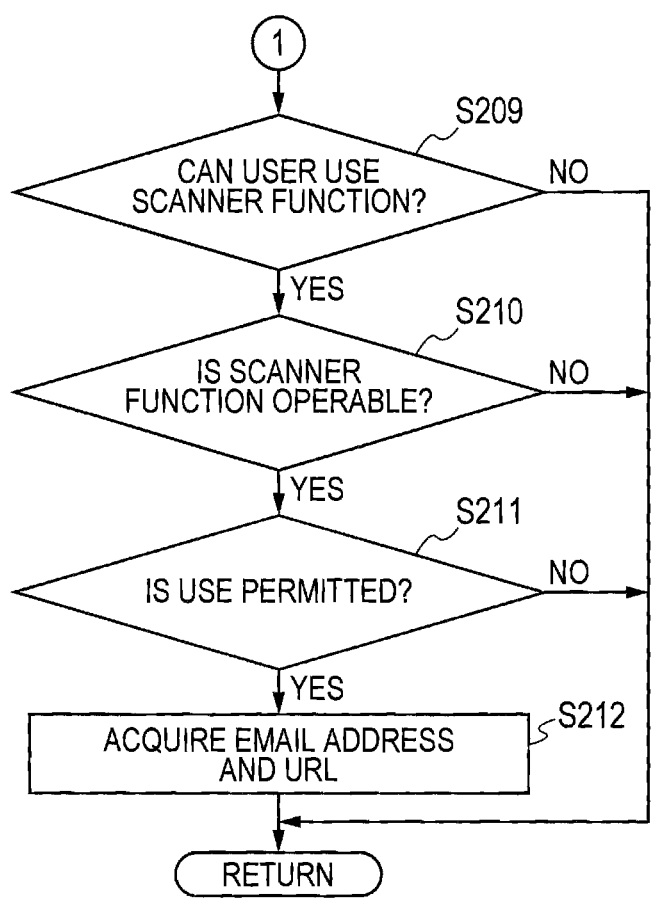
FIG. 8B is a flowchart showing the flow of the address-information acquiring process (the latter half)

Next, the address-information acquiring process executed in S110 will be described with reference to FIGS. 8A and 8B.

In S201, the communication control program 22 determines whether the user of the mobile phone 1 can use the telephone function based on the usable-function-for-each-user information acquired in S107, and causes the process to move to S202 when the user can use the telephone function, and to S205 when the user cannot use the telephone function.

In S202, the communication control program 22 determines whether the telephone function is operable based on the status information acquired in S101, and causes the process to move to S203 when the telephone function is operable, and to S205 when the telephone function is not operable.

In S203, the communication control program 22 determines whether the telephone number that is read out in S109 is the telephone number of which use is permitted based on the address usability information acquired in S108, and causes the process to move to S204 when the use is permitted, and to S205 when the use is not permitted.

In S204, the communication control program 22 acquires the telephone number that is read out in S109 as the usable telephone number.

In S205, the communication control program 22 determines whether the user of the mobile phone 1 can use the FAX function based on the usable-function-for-each-user information, and causes the process to move to S206 when the FAX function is usable, and to S209 when the FAX function is unusable.

In S206, the communication control program 22 determines whether the FAX function is operable based on the status information, and causes the process to move to S207 when the FAX function is operable, and to S209 when the FAX function is not operable.

In S207, the communication control program 22 determines whether the FAX number read out in S109 is the FAX number of which use is permitted based on the address usability information, and causes the process to move to S208 when the use is permitted, and to S209 when the use is not permitted.

In S208, the communication control program 22 acquires the FAX number that is read out in S109 as the usable FAX number.

In S209, the communication control program 22 determines whether the user of the mobile phone 1 can use the scanner function based on the usable-function-for-each-user information. The communication control program 22 causes the process to move to S210 when the scanner function is usable, and, when the scanner function is unusable, terminates the process and returns to the displaying process.

In S210, the communication control program 22 determines whether the scanner function is operable based on the status information. The communication control program 22 causes the process to move to S211 when the scanner function is operable, and, when the scanner function is not operable, terminates the process and returns to the displaying process.

In S211, the communication control program 22 determines whether the email address and the URL that are read out in S109 are the email address and the URL of which use is permitted based on the address usability information. The communication control program 22 causes the process to move to S212 when the use is permitted, and, when the use is not permitted, terminates the process and returns to the displaying process.

In S212, the communication control program 22 acquires the email address and the URL that are read out in S109 as the usable email address and URL.

The above-described address-information acquiring process is an example of an address-information determining process.

(6-4) Address-Information Transmitting Process

Next, an address information transmitting process executed by the communication control program 22 will be described. This process is started when the address information is selected on the address-information selecting screen 32.

When the address information is selected on the address-information selecting screen 32, the communication control program 22 transmits the selected address information to the multi-function peripheral 2, so as to instruct the multi-function peripheral 2 to communicate with the communication counterpart who is identified by the address information by using the communication function corresponding to the address information (S30 in FIG. 6).

When the selected address information is the telephone number, for example, the communication control program 22 transmits the selected telephone number to the multi-function peripheral 2, so as to instruct the multi-function peripheral 2 to make a telephone call to the communication counterpart who is identified by the telephone number. The address information transmitting process is an example of an instructing process.

(7) Effects of the Embodiment

According to the above-described communication control program 22, the address information is displayed on the address-information selecting screen 32 in such a manner that the address information usable in the multi-function peripheral 2 can be distinguished by the user of the mobile phone 1. This makes it possible to reduce the possibility of vainly selecting the address information that cannot be used in the multi-function peripheral 2, when performing the communication via the multi-function peripheral 2.

Further, the communication control program 22 receives the selection of the address information that is displayed on the address-information selecting screen 32, and instructs the multi-function peripheral 2 to communicate with the communication counterpart who is identified by the address information by using the communication function corresponding to the selected address information. This makes it possible for the user to communicate with the communication counterpart who is identified by the address information by the communication function corresponding to the address information selected by the mobile phone 1.

Further, the communication control program 22 causes the address-information selecting screen 32 to display only the address information that is usable in the multi-function peripheral 2. This makes it possible to reduce the possibility of vainly selecting the unusable address information.

Further, the communication control program 22 determines the address information corresponding to the communication functions usable in the multi-function peripheral 2 as the usable address information. This makes it possible to reduce the possibility of vainly selecting the address information corresponding to the unusable communication functions.

Further, the communication control program 22 acquires from the multi-function peripheral 2 the usable-function-for-each-user information that is associated with the user ID 25 of the user of the mobile phone 1, and determines the communication functions of the multi-function peripheral 2 that are permitted to the user of the mobile phone 1. This makes it possible to reduce the possibility of vainly selecting the address information of the communication functions that cannot be used in the multi-function peripheral 2.

Further, the communication control program 22 acquires the status information showing the operability of the communication functions from the multi-function peripheral 2, and determines the communication functions that are operable in the multi-function peripheral 2. This makes it possible to reduce the possibility of vainly selecting the address information of the communication functions that cannot be operated in the multi-function peripheral 2.

Further, the communication control program 22 acquires the address usability information from the multi-function peripheral 2, and determines the address information of which use is permitted in the multi-function peripheral 2. This makes it possible to reduce the possibility of vainly selecting the address information of which use is not permitted in the multi-function peripheral 2.

Further, when performing the communication via the multi-function peripheral 2, the communication control program 22 can reduce the possibility of vainly selecting the address information of the communication functions requiring charging, in the case where the user of the mobile phone 1 is in the unchargeable state.

<Second Embodiment>

Figure 9:
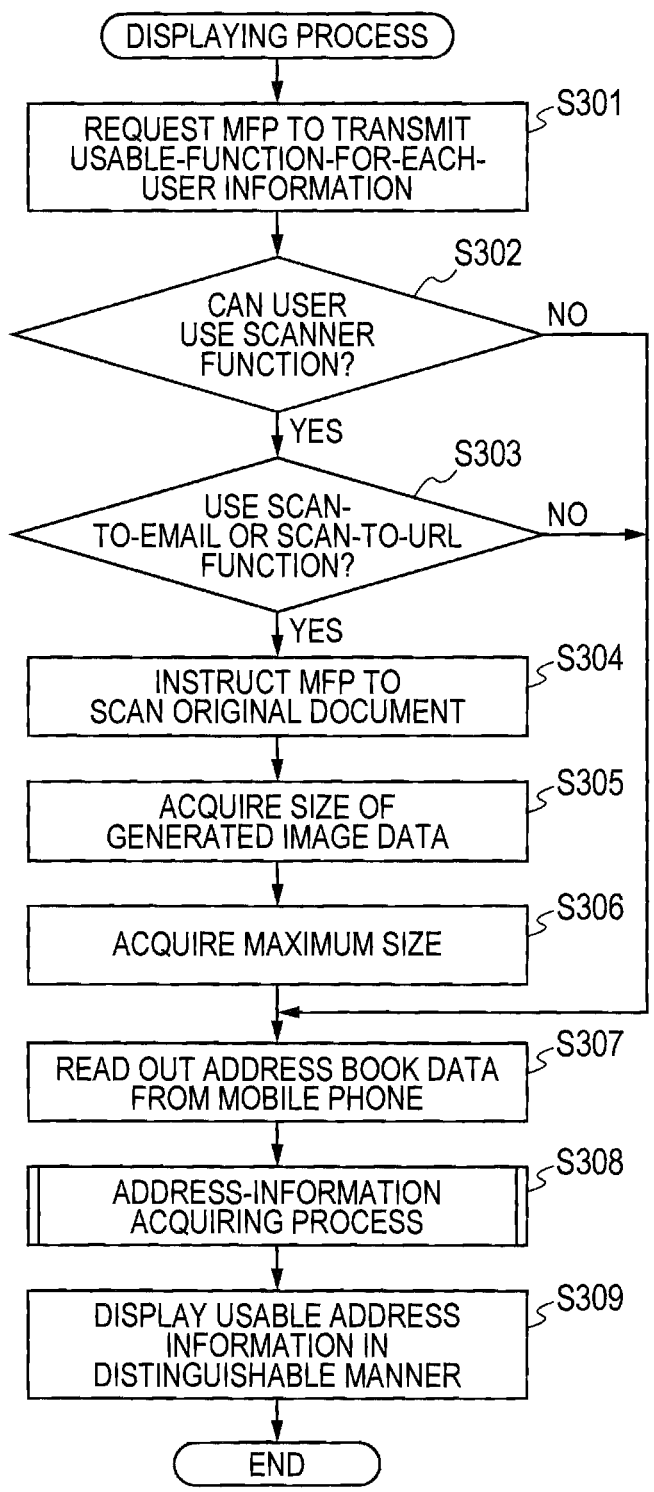
FIG. 9 is a flowchart showing the flow of a displaying process according to a second embodiment.
Figure 10:
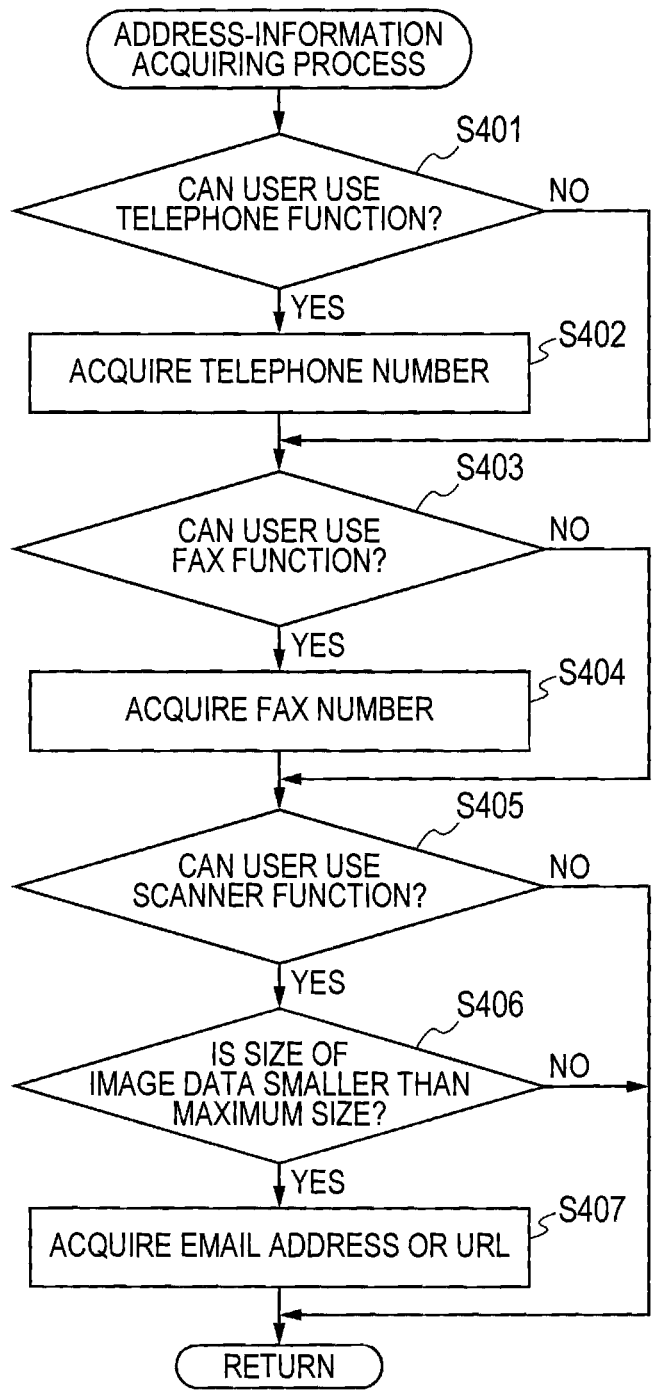
FIG. 10 is a flowchart showing the flow of an address-information acquiring process according to the second embodiment.

Next, a second embodiment will be described with reference to FIGS. 9 and 10.

In the multi-function peripheral 2 according to the second embodiment, maximum sizes of transmission data for the scan-to-Email function and the scan-to-URL function are set in advance. The multi-function peripheral 2 determines the size of the transmission data to be transmitted to the communication counterpart. When the size of the transmission data is equal to or greater than the above-described maximum sizes, the multi-function peripheral 2 rejects the use of the scan-to-Email function and the scan-to-URL function, and, when the size of the transmission data is smaller than the maximum sizes, permits the use of the functions.

Here, the multi-function peripheral 2 does not perform the charging, restriction of use of the address information using the address usability information, and the determination of the operability of the functions using the status information, in order to facilitate understanding of the embodiment. Note that the above processes may also be performed in the second embodiment.

(1) Displaying Process

The displaying process according to the second embodiment will be described with reference to FIG. 9. Here, the user first selects the communication function to be used on a communication function selecting screen (not shown), and thereafter selects the communication counterpart on the communication-counterpart selecting screen 31.

In S301, the communication control program 22 requests the multi-function peripheral 2 to transmit the usable-function-for-each-user information showing the functions that are usable by the user of the mobile phone 1, and acquires the usable-function-for-each-user information from the multi-function peripheral 2.

In S302, the communication control program 22 determines whether the user of the mobile phone 1 can use the scanner function based on the usable-function-for-each-user information, and causes the process to move to S303 when the scanner function is usable, and to S307 when the scanner function is unusable.

In S303, the communication control program 22 determines whether the communication function selected by the user is either one of the scan-to-Email function and the scan-to-URL function, and causes the process to move to S304 when either one of these is selected, and to S307 when neither one is selected.

In S304, the communication control program 22 instructs the multi-function peripheral 2 to scan an original document. This instruction includes scanning conditions of the original document (resolution, color/monochrome, a file format of scanned data, and the like).

Upon receiving the instruction to scan the original document, the multi-function peripheral 2 scans the original document that is set in the multi-function peripheral 2 and generates the image data.

In S305, the communication control program 22 acquires the size of the image data. The size of the image data may be calculated in and acquired from the multi-function peripheral 2. Further, the number of sheets of the scanned original document may be acquired from the multi-function peripheral 2, and the calculation may be made by the communication control program 22 by using the number of sheets of the original document and the above-described scanning conditions.

In S306, the communication control program 22 acquires, from the multi-function peripheral 2, the respective maximum sizes of the scan-to-Email function and the scan-to-URL function.

In S307, the communication control program 22 reads out, from the address book data 24, the address information for each communication mode of the communication counterpart who is selected on the communication-counterpart selecting screen 31.

In S308, the communication control program 22 executes the address-information acquiring process according to the second embodiment. The address-information acquiring process according to the second embodiment will be described later.

In S309, the communication control program 22 causes the display 14 to display the address-information selecting screen 32. Then, the communication control program 22 causes the address-information selecting screen 32 to display the address information acquired in S308.

(2) Address-Information Acquiring Process

Next, the address-information acquiring process according to the second embodiment, which is executed in S308, will be described with reference to FIG. 10.

In S401, the communication control program 22 determines whether the user of the mobile phone 1 can use the telephone function based on the usable-function-for-each-user information acquired in S301, and causes the process to move to S402 when the telephone function is usable, and to S403 when the telephone function is unusable.

In S402, the communication control program 22 acquires the telephone number that is read out in S307 as the usable telephone number.

In S403, the communication control program 22 determines whether the user of the mobile phone 1 can use the FAX function based on the usable-function-for-each-user information, and causes the process to move to S404 when the FAX function is usable, and to S405 when the FAX function is unusable.

In S404, the communication control program 22 acquires the FAX number that is read out in S307 as the usable FAX number.

In S405, the communication control program 22 determines whether the user of the mobile phone 1 can use the scanner function based on the usable-function-for-each-user information, and causes the step to move to S406 when the scanner function is usable, and, when the scanner function is unusable, terminates the process and returns to the displaying process.

In S406, the communication control program 22 determines whether the size acquired in S305 is smaller than the maximum size of the communication function selected by the user. When the scan-to-Email function is selected by the user, for example, the communication control program 22 compares the maximum size of the data that can be transmitted by the scan-to-Email function with the size of the image data acquired in S305. The communication control program 22 causes the process to move to S407 when it is determined that the size of the image data acquired in S305 is smaller than the maximum size in S406, and, when it is determined that the size of the image data acquired in S305 is equal to or greater than the maximum size, terminates the process and returns to the displaying process.

In S407, the communication control program 22 acquires the address information corresponding to the communication function selected by the user, out of the email address and the URL that are read out in S307, as the address information usable by the communication function.

When it is determined that the size of the image data acquired in S305 is equal to or greater than the maximum size in S406, as described above, step S407 is not executed, and hence the user cannot select the email address or the URL.

(3) Effects of the Embodiment

With the communication control program 22 according to the second embodiment as described thus far, the usable email address or URL is displayed in a distinguishable manner, when the size of the image data scanned by the multi-function peripheral 2 is within the maximum size of the transmission data set in the multi-function peripheral 2. This makes it possible to reduce the possibility of vainly selecting the address information of which maximum size of the transmission data is smaller than the size of the image data to be transmitted.

<Third Embodiment>

Next, a third embodiment will be described with reference to FIG. 11.

The address-information selecting screen 32 according to the third embodiment will be described with reference to FIG. 11. The address-information selecting screen 32 according to the third embodiment displays only the address information of the usable communication functions, and does not display the address information of the unusable communication functions.

With the communication control program 22 according to the above-described third embodiment, it is possible to reduce the possibility of vainly selecting the unusable address information.

<Fourth Embodiment>

Next, a fourth embodiment will be described with reference to FIG. 12.

The communication-counterpart selecting screen 31 according to the fourth embodiment will be described with reference to FIG. 12. The communication control program 22 according to the fourth embodiment causes the communication-counterpart selecting screen 31 to display the names of the communication counterparts in such a manner that the communication function corresponding to the address information that is determined to be usable can be distinguished. Note that the communication control program 22 according to the fourth embodiment causes the address-information selecting screen 32 to display the address information for all the communication modes of the communication counterpart who is selected on the communication-counterpart selecting screen 31.

Specifically, the communication control program 22 according to the fourth embodiment executes the processes S101 to S110 of the displaying process according to the first embodiment when displaying the communication-counterpart selecting screen 31, not when displaying the address-information selecting screen 32. Then, the communication control program 22 displays the function corresponding to the address information acquired by the processes S101 to S110 at a position next to the name of the communication counterpart, as the usable function.

As the communication counterpart is not yet selected when the communication-counterpart selecting screen 31 is displayed, the processes S101 to S110 are executed for all the communication counterparts registered in the address book data 24.

When the telephone number is acquired, for example, the communication control program 22 determines that the telephone function is usable, and displays a character string of "telephone usable" at the position next to the name of the communication counterpart.

When the email address or the URL is acquired, for example, the communication control program 22 determines that the scanner function is usable, and displays a character string of "scan usable" at the position next to the name of the communication counterpart.

Note that, when the scanner function is usable, the communication control program 22 may display "scan-to-Email usable" and "scan-to-URL usable".

Further, the communication control program 22 may display such a character string as "telephone unusable", "scan unusable", or the like, at the position next to the name of the communication counterpart, with regard to the communication function corresponding to the address information that is determined as unusable.

Further, it is also possible for the communication control program 22 according to the fourth embodiment not to display the unusable address information on the address-information selecting screen 32.

The above-described communication control program 22 according to the fourth embodiment causes the communication-counterpart selecting screen 31 to display the name of the communication counterpart in such a manner that the communication function corresponding to the usable address information can be distinguished. This makes it possible for the user to learn the unusable communication function. It is possible for the user to identify the usable communication function, and, as a result, to identify the usable address information. Therefore, the communication control program 22 can reduce the possibility of vainly selecting the address information that cannot be used in the multi-function peripheral 2, when performing the communication via the multi-function peripheral 2.

<Modifications>

While the invention has been described in detail with reference to the above aspects thereof, it would be apparent to those skilled in the art that various changes and modifications may be made therein without departing from the scope of the claims.

(1) According to the above-described first embodiment, the description is given to the example of displaying only the usable address information on the address-information selecting screen 32. Meanwhile, the usable address information and the unusable address information may be displayed on the address-information selecting screen 32 in a distinguishable manner.

For example, the address information of all the communication modes of the communication counterpart who is selected on the communication-counterpart selecting screen 31 may be displayed on the address-information selecting screen 32, and a character string of "usable" may be displayed at the position next to the usable address information. Alternatively, a character string of "unusable" may be displayed at the position next to the unusable address information. Alternatively, the character string of "usable" may be displayed at the position next to the usable address information, and the character string of "unusable" may be displayed at the position next to the unusable address information.

(2) According to the above-described first embodiment, the description is given to the example of executing S101 to S112 in the displaying process. Meanwhile, S101 to S108 and S112, out of the displaying process, may be executed when the instruction to display the communication-counterpart selecting screen 31 is given, and S109 to S111 may be executed in the displaying process. It is sufficient for S101 to S108 and S112 to be executed once when the instruction to display the communication-counterpart selecting screen 31 is given, as these are the processes independent of the communication counterpart. This also applies to the second to fourth embodiments.

(3) According to the above-described embodiments, the description is given to the multi-function peripheral 2 as an example of the communication device. However, the communication device is not limited to the multi-function peripheral 2. The communication device may be, for example, an image scanner, a FAX apparatus, or a telephone apparatus.

(4) According to the above-described embodiments, the description is given to the communication control program 22 that executes the process of instructing the multi-function peripheral 2 to perform the communication, as an example of the address-information display program. Meanwhile, the address-information display program may be so configured that the program does not execute the process of instructing the multi-function peripheral 2 to perform the communication. For example, when called up from an external program, such as an application program stored in the storage section 16 of the mobile phone 1 or the like, the communication-counterpart selecting screen 31 and the address-information selecting screen 32 may be displayed to receive selection of the address information, and the selected address information may be returned back to the external program. In other words, the address-information display program may provide only the interface for receiving the selection of the address information, and the selected address information may be used by the external program.

(5) According to the above-described embodiments, the description is given to the mobile phone 1 as an example of the information processing device. Meanwhile, the information processing device may be a personal computer, a personal digital assistant such as a tablet terminal, or the like.

(6) In the above-described embodiments, the processor 10 includes a single CPU. Alternatively, the processor 10 may be constituted by a plurality of CPUs, may be constituted by an ASIC, or may be constituted by a combination of one or more CPU and ASIC. Also, the above-described functions of the processor 10 may be executed by software, hardware, or a combination of software and hardware.

What is claimed is:

1. A non-transitory computer-readable storage medium storing an address-information display program including a set of program instructions executable on an information processing device configured to communicate with a counterpart device through a communication device having at least one communication function, the information processing device storing address information of the counterpart device, the communication device storing a plurality of user identification information and a plurality of usable-function-for-each-user information in association with each other, the plurality of user identification information being provided for respective ones of a plurality of information processing devices including the information processing device, each of the plurality of usable-function-for-each-user information being information for identifying a communication function that each of the plurality of information processing devices is allowed to use, the set of program instructions comprising:

a transmitting process of transmitting user identification information for identifying a specific user of the information processing device to the communication device;

a receiving process of receiving usable-function-for-each-user information identified by the communication device by using the user identification information;

an address-information determining process of determining, out of the at least one communication function of the communication device, a usable communication function that is usable by the specific user based on the usable-function-for-each-user information, and determining that the address information corresponding to the usable communication function is usable address information; and a displaying process of displaying the usable address information on a display of the information processing device in a distinguishable manner.

2. The storage medium storing the address-information display program according to claim 1, further comprising:

a selection receiving process of receiving selection of the address information that is displayed in the displaying process; and an instructing process of instructing the communication device to communicate with the communication counterpart identified by the address information that is received in the receiving process.

3. The storage medium storing the address-information display program according to claim 1, wherein the displaying process comprises displaying, on the display, a communication-counterpart selecting screen that displays a name of the communication counterpart and that receives selection of a communication counterpart, and an address-information selecting screen that displays address information of each communication function for the communication counterpart that is selected in the communication-counterpart selecting screen and that receives selection of address information; and wherein the displaying process comprises one of:

displaying, on the address-information selecting screen, only the address information that is determined to be usable in the address-information determining process out of the address information of each communication function for the communication counterpart that is selected in the communication-counterpart selecting screen; and displaying, on the address-information selecting screen, both the address information that is determined to be usable and the address information that is determined to be unusable in a distinguishable manner.

4. The storage medium storing the address-information display program according to claim 1, wherein the displaying process comprises displaying, on the display, a communication-counterpart selecting screen that displays a name of the communication counterpart and that receives selection of a communication counterpart, and an address-information selecting screen that displays address information of each communication function for the communication counterpart that is selected in the communication-counterpart selecting screen and that receives selection of address information; and wherein the displaying process comprises displaying the name in such a manner that a communication function corresponding to the address information determined to be usable in the address-information determining process is distinguishable.

5. The storage medium storing the address-information display program according to claim 1, wherein the address-information determining process comprises acquiring, from the communication device, status information indicative of whether the at least one communication function of the communication device is operable in order to determine an operable communication function, and determining that the operable communication function is the usable communication function.

6. The storage medium storing the address-information display program according to claim 1, wherein a maximum size of transmission data transmitted to the communication counterpart is set for each communication function of the communication device; and wherein the address-information determining process comprises determining a size of the transmission data and determining that a communication function for which the size of the transmission data is smaller than the maximum size is the usable communication function.

7. The storage medium storing the address-information display program according to claim 1, wherein the communication device stores address usability information for identifying the usable address information; and
  wherein the address-information determining process comprises acquiring the address usability information from the communication device and determining the usable address information based on the acquired address usability information.

8. A non-transitory storage medium storing the address-information display program including a set of program instructions executable on an information processing device configured to communicate with a communication counterpart through a communication device having at least one communication function, the information processing device storing address information of the communication counterpart, the set of program instructions further comprising:
  an address-information determining process of determining, out of the address information, usable address information that is usable with the at least one communication function of the communication device;
  a displaying process of displaying the usable address information on a display of the information processing device in a distinguishable manner;
  a user determining process of determining whether a user of the information processing device is a user to be charged; and
  a chargeability determining process of determining, on determination that the user of the information processing device is a user to be charged, whether the user is in a chargeable state where the user can be charged,
  wherein the address-information determining process comprises determining, on determination that the user is out of the chargeable state, that all the address information is unusable.

9. The storage medium storing the address-information display program according to claim 8, wherein the address-information determining process comprises determining, out of the at least one communication function of the communication device, a usable communication function that is usable by a user of the information processing device, and determining that the address information corresponding to the usable communication function is the usable address information.

10. The storage medium storing the address-information display program according to claim 9, wherein the communication device stores, for each user, user identification information and usable-function-for-each-user information in association with each other, the usable-function-for-each-user information being information for identifying a communication function that is usable on the communication device; and
  wherein the address-information determining process comprises acquiring, from the communication device, the usable-function-for-each-user information associated with the user identification information of the user of the information processing device, and determining the usable communication function based on the acquired usable-function-for-each-user information.

11. A communication controlling device configured to communicate with a counterpart device through a communication device having at least one communication function, the communication device storing a plurality of user identification information and a plurality of usable-function-for-each-user information in association with each other, the plurality of user identification information being provided for respective ones of a plurality of communication controlling devices including the communication controlling device, each of the plurality of usable-function-for-each-user information being information for identifying a communication function that each of the plurality of communication controlling devices is allowed to use, the communication controlling device comprising:
  a display;
  a storage device storing address information of the counterpart device, and
  a processor configured to:
    transmit user identification information for identifying a specific user of the communication controlling device to the communication device;
    receive usable-function-for-each-user information identified by the communication device by using the user identification information;
    determine, out of the at least one communication function of the communication device, a usable communication function that is usable by the specific user based on the usable-function-for-each-user information, and determine that the address information corresponding to the usable communication function is usable address information; and
    display the usable address information on the display in a distinguishable manner.

12. The communication controlling device according to claim 11, wherein the processor is configured to:
  receive selection of the address information that is displayed on the display; and
  instruct the communication device to communicate with the communication counterpart identified by the received address information.

13. The communication controlling device according to claim 11, wherein the processor is configured to display, on the display, a communication-counterpart selecting screen that displays a name of the communication counterpart and that receives selection of a communication counterpart, and an address-information selecting screen that displays address information of each communication function for the communication counterpart that is selected in the communication-counterpart selecting screen and that receives selection of address information; and
  wherein the processor is configured to either: display, on the address-information selecting screen, only the address information that is determined to be usable in the address-information determining process out of the address information of each communication function for the communication counterpart that is selected in the communication-counterpart selecting screen; or display, on the address-information selecting screen, both the address information that is determined to be usable and the address information that is determined to be unusable in a distinguishable manner.

14. The communication controlling device according to claim 11, wherein the processor is configured to display, on the display, a communication-counterpart selecting screen that displays a name of the communication counterpart and that receives selection of a communication counterpart, and an address-information selecting screen that displays address information of each communication function for the communication counterpart that is selected in the communication-counterpart selecting screen and that receives selection of address information; and
  wherein the processor is configured to display, on the display, the name in such a manner that a communication function corresponding to the address information determined to be usable is distinguishable.

15. The communication controlling device according to claim 11, wherein the processor is configured to acquire, from the communication device, status information indicative of whether the at least one communication function of the communication device is operable in order to determine an operable communication function, and to determine that the operable communication function is the usable communication function.

16. The communication controlling device according to claim 11, wherein a maximum size of transmission data transmitted to the communication counterpart is set for each communication function of the communication device; and
   wherein the processor is configured to determine a size of the transmission data and to determine that a communication function for which the size of the transmission data is smaller than the maximum size is the usable communication function.

17. The communication controlling device according to claim 11, wherein the communication device stores address usability information for identifying the usable address information; and
   wherein the processor is configured to acquire the address usability information from the communication device and to determine the usable address information based on the acquired address usability information.

18. A communication controlling device configured to communication with a communication counterpart through a communication device having at least one communication function, comprising:
   a processor;
   a display; and
   a storage device storing address information of the communication counterpart,
   wherein the processor is configured to:
      determine, out of the address information, usable address information that is usable with the at least one communication function of the communication device;
      display the usable address information on the display in a distinguishable manner;
      determine whether a user of the communication controlling device is a user to be charged;
      determine, on determination that the user of the communication controlling device is a user to be charged, whether the user is in a chargeable state where the user can be charged; and
      determine, on determination that the user is out of the chargeable state, that all the address information is unusable.

19. The communication controlling device according to claim 18, wherein the processor is configured to determine, out of the at least one communication function of the communication device, a usable communication function that is usable by a user of the communication controlling device, and to determine that the address information corresponding to the usable communication function is the usable address information.

20. The communication controlling device according to claim 19, wherein the communication device stores, for each user, user identification information and usable-function-for-each-user information in association with each other, the usable-function-for-each-user information being information for identifying a communication function that is usable on the communication device; and
   wherein the processor is configured to acquire, from the communication device, the usable-function-for-each-user information associated with the user identification information of the user of the communication controlling device, and to determine the usable communication function based on the acquired usable-function-for-each-user information.

* * * * *